United States Patent
Kuriki et al.

(10) Patent No.: US 11,346,505 B2
(45) Date of Patent: May 31, 2022

(54) FLUID SUPPLY SYSTEM, FLUID CONTROL DEVICE, AND SEMICONDUCTOR MANUFACTURING DEVICE

(71) Applicant: FUJIKIN INCORPORATED, Osaka (JP)

(72) Inventors: Haruhiko Kuriki, Osaka (JP); Hajime Nakagawa, Osaka (JP); Kenji Aikawa, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/250,980

(22) PCT Filed: Oct. 3, 2019

(86) PCT No.: PCT/JP2019/039160
§ 371 (c)(1),
(2) Date: Apr. 6, 2021

(87) PCT Pub. No.: WO2020/085033
PCT Pub. Date: Apr. 30, 2020

(65) Prior Publication Data
US 2021/0388949 A1    Dec. 16, 2021

(30) Foreign Application Priority Data
Oct. 26, 2018   (JP) .............................. JP2018-201751

(51) Int. Cl.
*F16L 3/01* (2006.01)
*F17D 1/04* (2006.01)
(Continued)

(52) U.S. Cl.
CPC .............. *F17D 1/04* (2013.01); *F16K 27/02* (2013.01); *F16L 41/03* (2013.01)

(58) Field of Classification Search
CPC ... F17D 1/04; F16L 3/22; F16L 3/2235; F16L 15/007; F16L 25/12; F16L 41/03
See application file for complete search history.

(56) References Cited

U.S. PATENT DOCUMENTS 5,280,964 A * 1/1994 Walker ................ F16L 19/0218
248/68.1
5,439,026 A * 8/1995 Moriya ................ G05D 7/0635
137/486

(Continued)

FOREIGN PATENT DOCUMENTS

JP     2015138338 A    7/2015
JP     2016191405 A    11/2016

(Continued)

OTHER PUBLICATIONS

International Search Report and Written Opinion in corresponding International Patent Application PCT/JP2019/039160 dated Dec. 24, 2019.

*Primary Examiner* — Reinaldo Sanchez-Medina
(74) *Attorney, Agent, or Firm* — Westman, Champlin & Koehler, P.A.

(57) ABSTRACT

A fluid supply system includes: fluid lines, fluid controllers and joints, in which each of the fluid lines linearly extends in an extension direction that substantially perpendicularly intersects an alignment direction of the fluid lines, each of the fluid controllers is disposed in an aligned manner in the alignment direction with connection surfaces directed to the same direction, a diameter of the pipings is equal to or less than a surface width of the connection surfaces in the alignment direction, and diameters of the joints are equal to or greater than the surface width, and the pipings that are adjacent to each other in the alignment direction are positioned with the joints displaced from each other in the extension direction.

12 Claims, 6 Drawing Sheets

(51) Int. Cl.
*F16K 27/02* (2006.01)
*F16L 41/03* (2006.01)

(56) References Cited

U.S. PATENT DOCUMENTS

| | | | |
|---|---|---|---|
| 6,763,848 B2* | 7/2004 | Rondreux | F15B 13/0817 |
| | | | 137/269 |
| 8,196,609 B2* | 6/2012 | Oya | F16K 27/003 |
| | | | 137/884 |
| 8,251,087 B2* | 8/2012 | Hecht | F16K 27/003 |
| | | | 137/271 |
| 2002/0033195 A1* | 3/2002 | Fujimoto | F16K 27/003 |
| | | | 137/884 |
| 2008/0224078 A1 | 9/2008 | Hecht | |
| 2010/0264652 A1* | 10/2010 | Mitterer | F16L 39/02 |
| | | | 285/397 |
| 2016/0327963 A1 | 11/2016 | Hirata et al. | |
| 2018/0299042 A1 | 10/2018 | Ishibashi et al. | |

FOREIGN PATENT DOCUMENTS

| | | |
|---|---|---|
| JP | 2016194318 A | 11/2016 |
| JP | 2016205408 A | 12/2016 |
| JP | 2017174427 A | 9/2017 |
| JP | 2018084255 A | 5/2018 |

* cited by examiner

FLUID SUPPLY SYSTEM, FLUID CONTROL DEVICE, AND SEMICONDUCTOR MANUFACTURING DEVICE

CROSS-REFERENCE TO RELATED APPLICATION(S)

This application is a Section 371 National Stage Application of International Application No. PCT/JP2019/039160, filed Oct. 3, 2019 and published as WO 2020/085033 A1 on Apr. 30, 2020, and further claims priority to Japanese Patent Application Ser. No. 2018-201751, filed Oct. 26, 2018.

TECHNICAL FIELD

The present invention relates to a fluid supply system, a fluid control device, and a semiconductor manufacturing device.

BACKGROUND ART

Patent Document 1 discloses a fluid supply system including a plurality of fluid lines aligned in parallel, in which fluid controllers and joints are connected in series with pipings. Such a fluid supply system is configured by disposing the plurality of fluid controllers in an integrated manner and realizes size reduction of a fluid control device (gas box) accommodating the fluid supply system in a casing.

PRIOR ART DOCUMENT

Patent Document
Patent Document 1: Japanese Patent Laid-Open No. 2018-84255

SUMMARY OF THE INVENTION

Problems to be Solved by the Invention

In order to realize a highly-integrated small-sized fluid control device, it is necessary to densely integrate the fluid control device by reducing the surface width of the fluid controllers in an alignment direction of the fluid lines (to about ⅓ the surface width in the related art, for example) and reducing the pitch width of the disposition in the parallel alignment direction. However, the joints need to be thick to some extend to secure strength of torque applied portions that are fastened by being turned with a tool such as a wrench, and there is a limit of reduction of the thickness. Therefore, it is necessary to secure a working space for performing a joint fastening operation in the densely integrated piping structure, which prevents further size reduction of the fluid supply system and the fluid control device.

In a semiconductor manufacturing process, for example, treatment gas (fluid) passing through a gas box is supplied to a chamber for performing a treatment. In a treatment process of accumulating a film on a semiconductor substrate by an atomic layer deposition (ALD) method, a minute flow amount of treatment gas has to be quickly and precisely supplied to a chamber. In other words, there is a requirement of further improved responsiveness and controllability in the treatment process based on the ALD method.

In order to further reduce a fluid supply system in size while securing a working space in a piping structure in the fluid supply system, further reduce a fluid control system including the system in size, and realize further improved responsiveness and controllability in a treatment process based on the ALD method performed by a semiconductor manufacturing device including the device, problems still remain.

The present invention has been made in view of such problems, and embodiments thereof provide a fluid supply system that is further reduced in size while securing a working space in a piping structure, a fluid control device that is further reduced in size, and a semiconductor manufacturing device that realizes further improved responsiveness and controllability in a treatment process based on the ALD method.

Means for Solving the Problems

The present invention can be realized in the following aspects.

A fluid supply system according to an aspect is a fluid supply system including: a plurality of fluid lines aligned in parallel, fluid controllers and joints being connected in series with pipings in the fluid lines, in which each of the fluid lines linearly extends in an extension direction that substantially perpendicularly intersects an alignment direction of the fluid lines when the fluid lines are seen in a plane including the alignment direction, each of the fluid controllers is disposed in an aligned manner in the alignment direction with connection surfaces to which the pipings are connected directed to the same direction, a diameter of the pipings is equal to or less than a surface width of the connection surfaces in the alignment direction, and diameters of the joints are equal to or greater than the surface width of the connection surface in the alignment direction, and the pipings that are adjacent to each other in the alignment direction are positioned with the joints displaced from each other in the extension direction.

In the aforementioned fluid supply system according to the present aspect, when an intersecting direction that substantially perpendicularly intersects both the alignment direction and the extension direction is defined, any one of the pipings that are adjacent to each other in the alignment direction has a bent portion that positions the joints to be displaced from each other in the intersecting direction.

Moreover, in the aforementioned fluid supply system according to the present aspect, the joints have first joint members, second joint members screwed to the first joint members, and torque applied portions to which a rotation torque is applied when the second joint members are screwed to the first joint members, when an intersecting direction that substantially perpendicularly intersects both the alignment direction and the extension direction is defined, the pipings that are adjacent to each other in the alignment direction are positioned with at least the torque applied portions of the joints displaced from each other in both the extension direction and the intersecting direction.

A fluid control device according to the aspect includes: the aforementioned fluid supply system accommodated in a casing.

A semiconductor manufacturing device according to the aspect that includes the aforementioned fluid control device further includes: a chamber, to which the pipings extending from the fluid control device are connected, in which a fluid supplied from the fluid control device is treated; and an opening/closing valve provided at the pipings between the fluid control device and the chamber to control the flow amount of the fluid supplied from the fluid control device to the chamber.

Advantageous Effects of the Invention

According to the aforementioned aspect of the present invention, it is possible to provide a fluid supply system that is further reduced in size while securing a working space in a piping structure, a fluid control device that is further reduced in size, and a semiconductor manufacturing device that realizes further improved responsiveness and controllability in treatment process based on the ALD method.

The present summary is provided only by way of example, and not limitation. Other aspects of the present invention will be appreciated in view of the entirety of the present disclosure, including the entire text, claims and accompanying figures.

Figure 1:
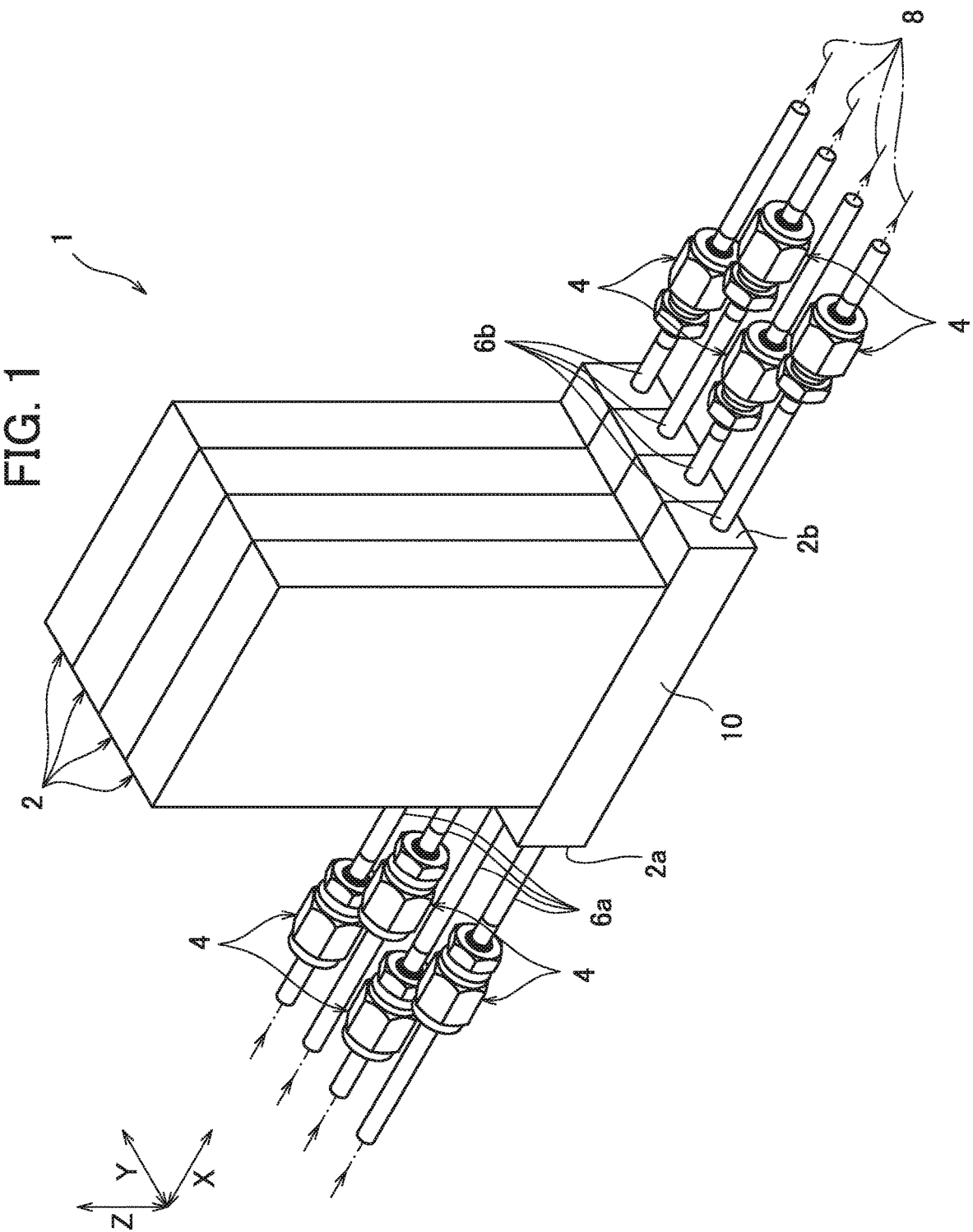
FIG. 1 is a perspective view of a fluid supply system according to an embodiment of the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

MODE FOR CARRYING OUT THE INVENTION

Hereinafter, a fluid supply system, a fluid control device including the system, and a semiconductor manufacturing device including the device according to an embodiment of the present invention will be described on the basis of drawings.

FIG. 1 illustrates a perspective view of a fluid supply system 1. The fluid supply system 1 is configured of a plurality of fluid lines 8 aligned in parallel, in which fluid controllers 2 and joints 4 are connected in series with pipings 6a and 6b (hereinafter, also representatively referred to as pipings 6). Note that each of the following drawings will be described with definitions that the fluid lines 8 extend in an extension direction X and are aligned in an alignment direction Y and a direction that substantially perpendicularly intersects both the extension direction X and the alignment direction Y is an intersecting direction Z.

The fluid controllers 2 are, for example, mass flow controllers, a pressure control-type flow amount controller, or the like, and main bodies of the fluid controllers 2 are secured to a base block 10. For the base block 10, connection surfaces 2a to which the pipings 6a on an inlet side of a fluid to the fluid controllers 2 are connected through screwing and connection surfaces 2b to which the pipings 6b on an outlet side of the fluid from the fluid controllers 2 are connected through screwing are formed.

The fluid that has flowed into the fluid controllers 2 from the pipings 6a is subjected to flow amount control performed by the fluid controllers 2, then passes through flow paths, which is not illustrated, in the base block 10, and flows out to the pipings 6b. Note that for one of the fluid lines 8, other devices related to fluid control such as an opening/closing valve and a regulator, which are not illustrated, may be provided as one of the fluid controllers 2 such that the devices are secured to the base block 10.

Moreover, in a case in which the base block 10 is not provided, the pipings 6a and 6b may be connected to connection surfaces 2a and 2b formed at main bodies of the fluid controllers 2. Moreover, the plurality of fluid controllers 2 and the joints 4 may be provided for one fluid line 8. Moreover, the base block 10 may be an integrated base block in which a combined flow path is formed.

Figure 2:
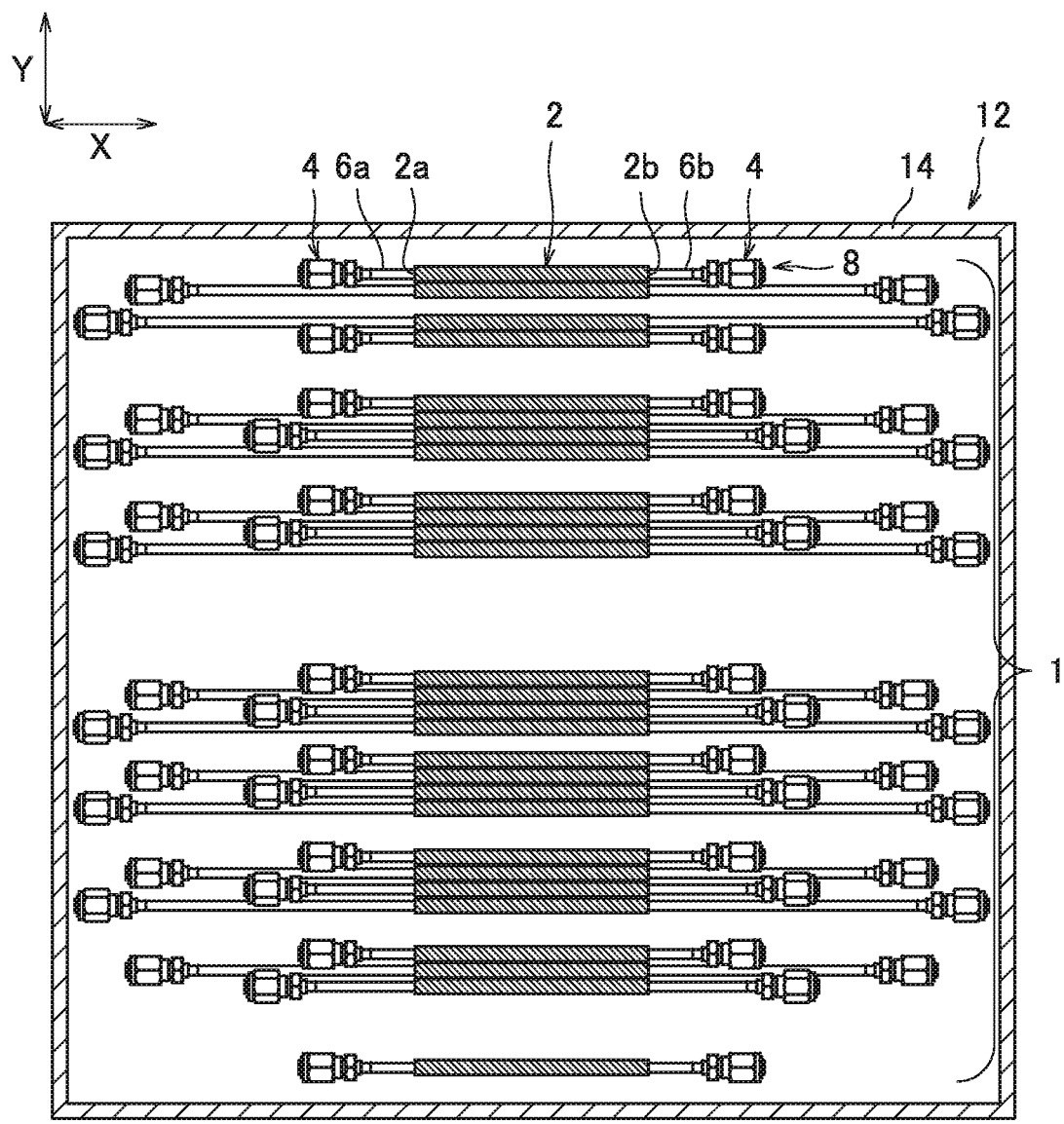
FIG. 2 is a front view of a fluid control device according to an embodiment of the present invention.

FIG. 2 illustrates a front view of a fluid control device 12. The fluid control device 12 includes the fluid supply system 1 accommodated in a casing 14, the sectional view of which is illustrated in FIG. 2, and in a case in which a fluid that is a control target is gas, the fluid control device 12 is a so-called gas box and includes multiple gas supply lines as the fluid lines 8. Devices related to fluid control such as an opening/closing valve and a regulator, which are not illustrated, are appropriately disposed in a vacant space inside the casing 14, and each fluid line 8 is disposed at a position at which the fluid line 8 does not interfere with the devices.

Each fluid line 8 linearly extends in the extension direction X (the left-right direction in FIG. 2) that substantially perpendicularly intersects the alignment direction Y in a plane including the alignment direction Y (the up-down direction in FIG. 2) of the fluid lines, that is, when seen in the state in FIG. 2. In other words, since the pipings 6 have bent portions 18, which will be described later, orthographic projection of each fluid line 8 in FIG. 2 looks like linearly extending in the extension direction X. Moreover, the fluid controllers 2 are disposed in an aligned manner in the alignment direction Y with the connection surfaces 2a directed to the same direction on the left side in FIG. 1 and with the connection surfaces 2b directed to the same direction on the right side in FIG. 1.

Figure 3:
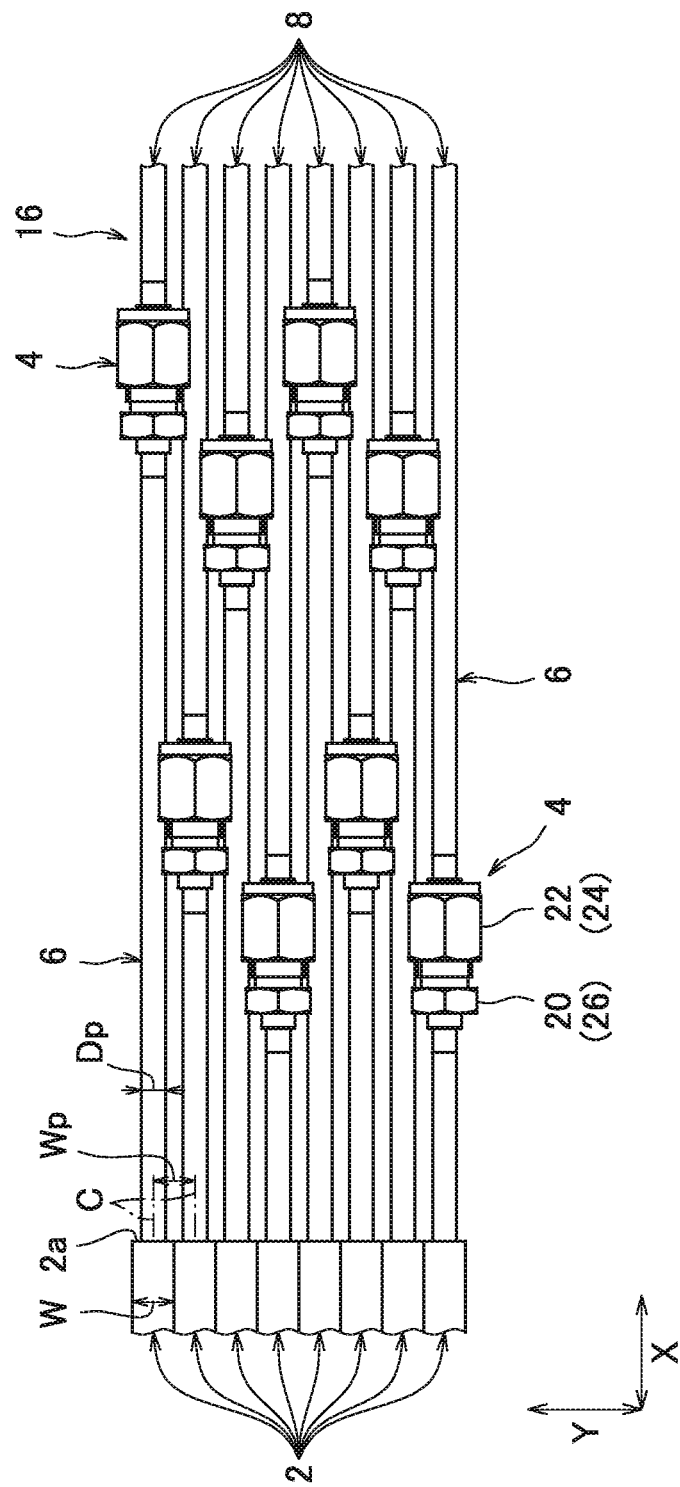
FIG. 3 is a plan view illustrating a piping structure in the fluid supply system in an enlarged manner.

FIG. 3 illustrates a plan view of a piping structure 16 in the fluid supply system 1 in an enlarged manner. The diameter Dp of the pipings 6 is equal to or less than the surface width W of the connection surfaces 2a of the fluid controllers 2 in the alignment direction Y. The same applies to the surface width W of the connection surfaces 2b. The pipings 6 can linearly extend in the extension direction X within a range of the surface width W of the connection surfaces 2a and 2b, and the pipings 6 that are adjacent to each other in the alignment direction Y do not come into contact with each other, by disposing the connection surfaces 2a and 2b of the fluid controllers 2 with each of the connection surfaces 2a and 2b directed to the same directions and by setting the diameter Dp of the pipings 6 to be equal to or less than the surface width W of the connection surfaces 2a and 2b in this manner.

Specifically, the connection surfaces 2a of the fluid controllers 2 have a surface width W that is about ⅓ the surface width in the related art. Moreover, the pipings 6 are densely aligned in the alignment direction Y such that axial centers C have a constant pitch width Wp in a plan view. For example, the surface width W is 10 mm, the pitch width Wp is 11 mm, and in this case, the gap between the fluid controllers 2 that are adjacent to each other in the alignment direction Y is 1 mm. In this manner, the fluid supply system 1 according to the present embodiment is further integrated and reduced in size as compared with the related art.

Figure 4:
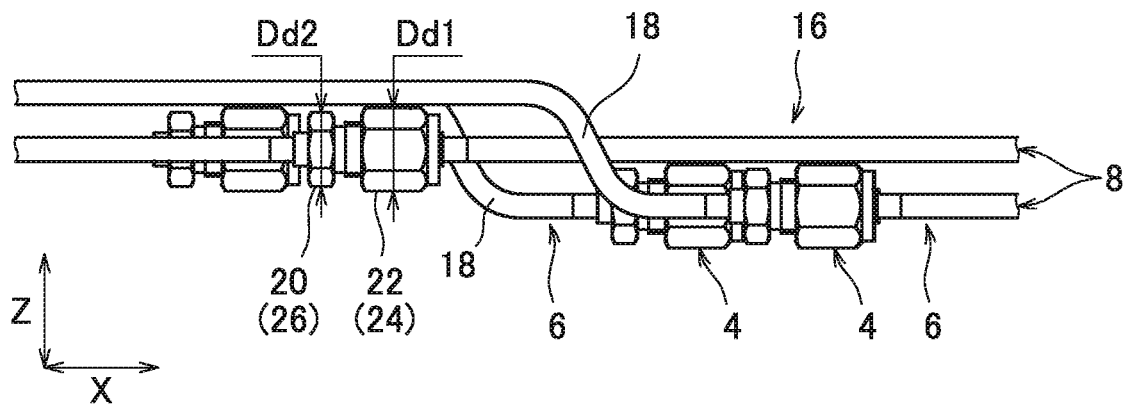
FIG. 4 is a side view of the piping structure when seen in the alignment direction Y in FIG. 3.

FIG. 4 illustrates a side view of the piping structure 16 when seen in the alignment direction Y in FIG. 3.

When the intersecting direction Z that substantially perpendicularly intersects both the alignment direction Y and the extension direction X is defined in the fluid supply system 1 according to the present embodiment, any one of the pipings 6 that are adjacent to each other in the alignment direction Y has a bent portion 18 that positions the joints 4 to be displaced from each other in the intersecting direction Z. Note that the bent portion 18 is not necessarily formed to be bent at a right angle along the intersecting direction Z from a straight pipe portion of the piping 6 and the angle between the straight pipe portion of the piping 6 and the bent portion 18 may be an acute angle or an obtuse angle as long as the bent portion 18 can displace the joints 4 from each other in the intersecting direction Z.

As illustrated in FIG. 3, the joints 4 are screwed-type pipe joints and include male nuts (first joint members) 20 that are hexagon nuts and female nuts (second joint members) 22 that are hexagon nuts. The pipings 6 separated in the extension direction X are connected to each other by the female nuts 22 screwed onto the male nuts 20. Torque applied portions 24 with a diagonal dimension Dd1 are formed at the female nuts 22. A rotation torque is applied to the female nuts 22 by engaging a tool such as a wrench with the torque applied portions 24 and turning the torque applied portions 24 when the female nuts 22 are screwed onto the male nuts 20.

On the other hand, fixed portions (torque applied portion) 26 with a diagonal dimension Dd2 are formed at the male nuts 20. The male nuts 20 are prevented from spinning around by engaging a tool such as a wrench with the fixed portions 26 and fixing the male nuts 20 when the torque is applied to the torque applied portions 24. Note that if this is considered as an application of a fixing torque to the male nuts 20 to prevent the male nuts 20 from spinning around, the fixed portions 26 can also be handled as the torque applied portions 24. Therefore, the fixed portions 26 may also collectively be referred to as torque applied portions 24 below.

The diameter of the joints 4, in particular, the diagonal dimension Dd1 of the torque applied portions 24 and the diagonal dimension Dd2 of the fixed portions 26 are equal to or greater than the surface width W of the connection surfaces 2a and 2b of the fluid controllers 2. The joints 4 need to be thick to some extent to secure the strength of the torque applied portions 24 that are fastened by being turned with a tool such as a wrench, there is a limit of reduction of the thickness, and the size needs to be equal to or greater than the surface width W of the connection surfaces 2a and 2b. However, since the pipings 6 that are adjacent to each other in the alignment direction Y are positioned with the joints 4 displaced from each other in the extension direction X, the joints 4 provided at the pipings 6 that are adjacent to each other in the alignment direction Y do not come into contact with each other.

Further, in the present embodiment, the pipings 6 that are adjacent to each other in the alignment direction Y is positioned with at least the torque applied portions 24 of the joints 4 displaced from each other both in the extension direction X and the intersecting direction Z, as is obvious from FIGS. 3 and 4.

Figure 5:
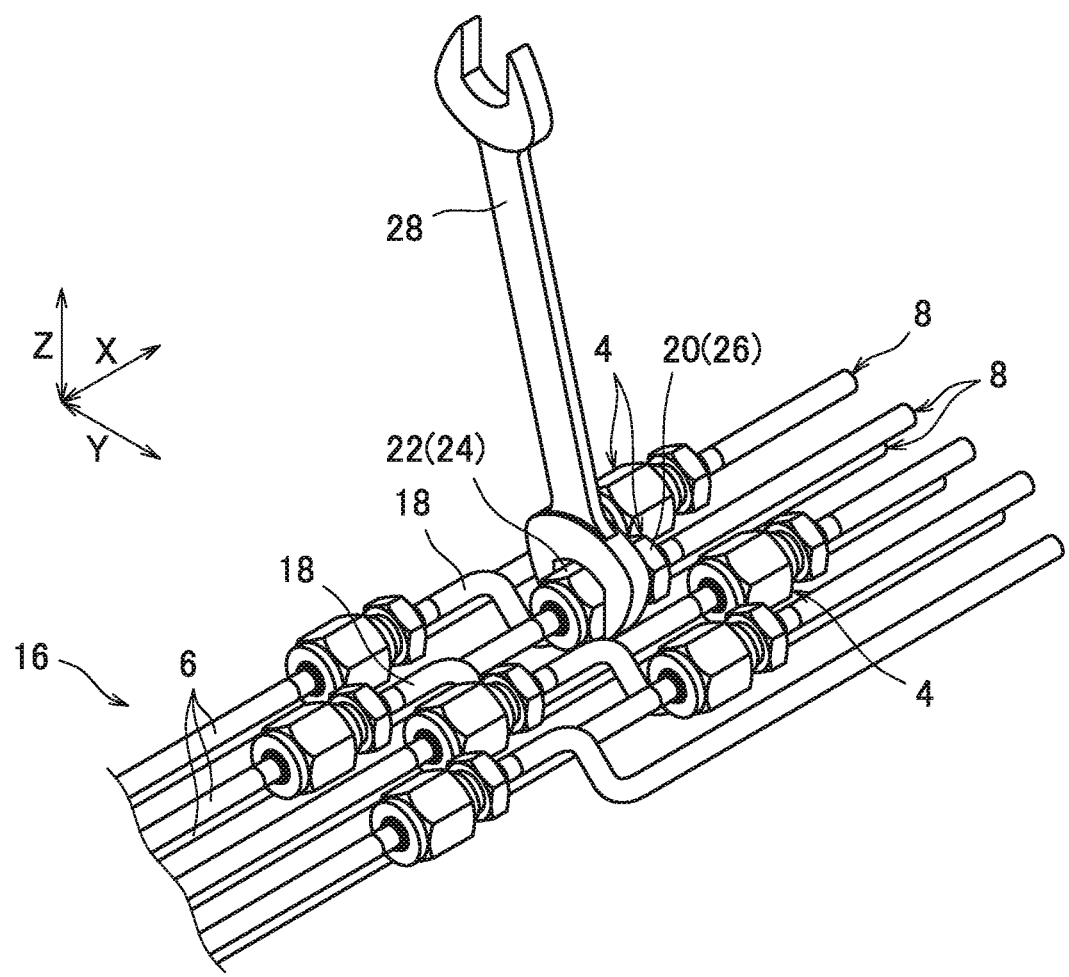
FIG. 5 is a perspective view of the piping structure when a torque is applied to a torque applied portion of a female nut by a wrench.

FIG. 5 illustrates a perspective view of the piping structure 16 when a torque is applied to a torque applied portions 24 of a female nut 22 by a wrench 28.

The aforementioned bent portion 18 is formed at the piping 6 that is adjacent to the piping 6 that has the torque applied portion 24 with which the wrench 28 is engaged. In this manner, the joints 4 can be positioned to be displaced from each other not only in the extension direction X but also in the intersecting direction Z for the pipings 6 that are adjacent to each other in the alignment direction Y. Therefore, a working space in which the engagement of the wrench 28 with the torque applied portions 24 and the turning of the torque applied portions 24 with the wrench 28 can be performed is secured in the piping structure 16 regardless of the piping structure 16 densely integrated in the alignment direction Y.

Figure 6:
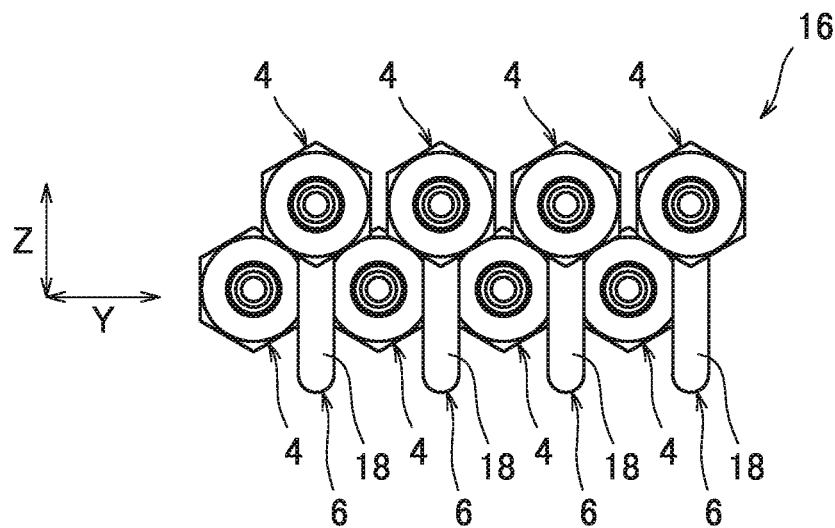
FIG. 6 is a sectional view of the piping structure when seen in the extension direction X in FIG. 3.

FIG. 6 illustrates a sectional view of the piping structure 16 when seen in the extension direction X. As is obvious from FIG. 6, it is possible to form the piping structure 16 that is densely integrated not only in the alignment direction Y but also in the intersecting direction Z while allowing the engagement of the wrench 28 with the torque applied portions 24 and turning of the torque applied portions 24 with the wrench 28, by forming the bent portions 18 at the pipings 6. Therefore, it is possible to realize further reduction of the piping structure 16, the fluid supply system 1, and thus the fluid control device 12 in size while allowing for an operation of fastening the joints 4.

Moreover, since the operation of fastening the joints 4 is mainly performed at the torque applied portions 24, at least the torque applied portions 24 of the joints 4 instead of the entire joints 4 may be positioned to be displaced from each other both in the extension direction X and the intersecting direction Z. In this manner, it is possible to secure only the working space for a part of the joints 4 requiring the fastening operation instead of the entire joints 4. Therefore, it is possible to realize further reduction of the piping structure 16, the fluid supply system 1, and thus the fluid control device 12 in size.

Figure 7:
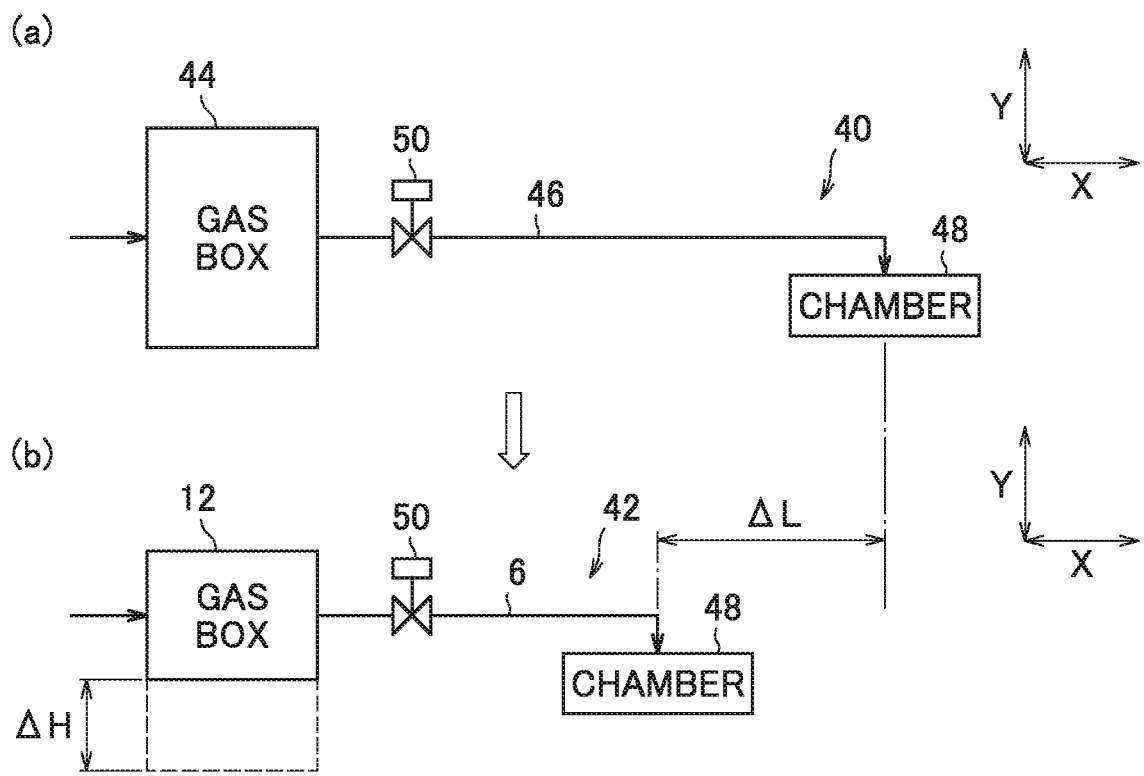
FIG. 7 is a block diagram illustrating, in a comparative manner, (a) a part of a semiconductor manufacturing device in the related art and (b) a part of a semiconductor manufacturing device in the present embodiment.

FIG. 7 is a block diagram illustrating, in a comparative manner, (a) a part of a semiconductor manufacturing device in the related art and (b) a part of a semiconductor manufacturing device in the present embodiment.

As illustrated in FIG. 7(a), the semiconductor manufacturing device 40 in the related art includes a gas box 44 that is a fluid control device, a chamber 48, to which pipings 46 extending from the gas box 44 are connected, in which gas supplied from the gas box 44 is treated, and an opening/closing valve 50 provided at the pipings 46 between the gas box 44 and the chamber 48 to control the flow amount of the gas supplied from the gas box 44 to the chamber 48.

Figure 8:
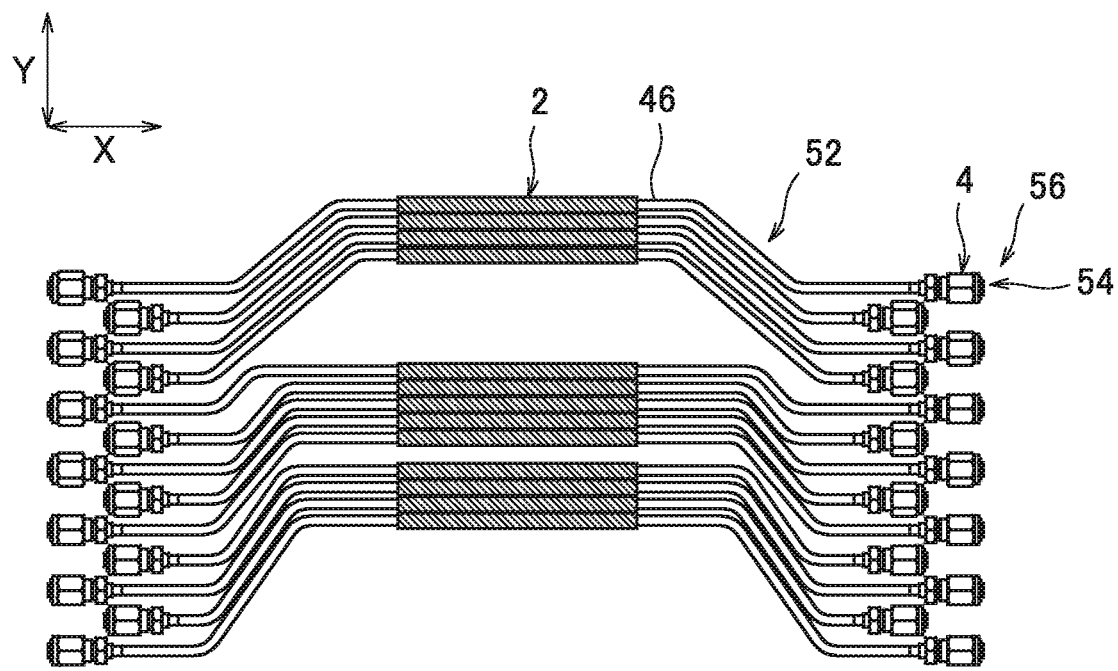
FIG. 8 is a plan view of a piping structure in the related art formed by pipings in the related art when seen in an intersecting direction.

FIG. 8 illustrates a plan view of a piping structure 52 in the related art formed of the pipings 46 in the related art when seen in the intersecting direction Z. The piping structure 52 configures a fluid supply system 56 including a plurality of fluid lines 54 aligned in parallel, in which fluid controllers 2 with a surface width W similar to those in the present embodiment and joints 4 similar to those in the present embodiment are connected to each other with pipings 46.

However, in the piping structure 52 in the fluid supply system 56 in the related art, each fluid line 54 is largely bent in the alignment direction Y in the state in FIG. 8, that is, when seen in the plane including the alignment direction Y. In other words, each fluid line 54 does not have projection linearly extending in the extension direction X. This is because the joints 4 that are adjacent to each other in the alignment direction Y come into contact with each other in a case in which the pipings 46 linearly extend in the extension direction X, and there is no other choice than largely bending each piping 46 in the alignment direction Y to secure the working space for the joints 4.

Therefore, there is no other choice than causing each piping 46 to extend with significant bending in the alignment direction Y to separate the joints 4 from each other and securing the working space in which the operation of fastening the joints 4 can be performed only in the alignment direction Y between the adjacent pipings 46 in the related art.

On the other hand, the semiconductor manufacturing device 42 in the present embodiment includes, as a part, the aforementioned fluid control device 12 (hereinafter, also referred to as a gas box 12; the same applies to the illustration in FIG. 7(*b*)), the aforementioned pipings 6, the chamber 48 similar to that in the related art, and the opening/closing valve 59 similar to that in the related art as illustrated in FIG. 7(*b*).

The gas box 12 has a width in the alignment direction Y that is shorter than the width of the gas box 44 in the related art by ΔH since each piping 6 linearly extends in the extension direction X when seen in the intersecting direction Z in the piping structure 16 in the fluid supply system 1 as a result of forming the bent portions 18 at the pipings 6. It is thus possible to provide the gas box 12 that is further reduced in size by effectively utilizing the space in the casing 14 in the intersecting direction Z. Therefore, it is possible to place the gas box 12 in a small narrow space in the semiconductor manufacturing device 42 and to reduce the distance of each piping 6 from the gas box 44 to the chamber 48 in the related art by ΔL.

Although all the pipings 46 are largely bent in the alignment direction Y in the related art, it is only necessary to provide the bent portion 18 at any one of the pipings 6 that are adjacent to each other in the alignment direction Y such that the bent portion is bent in the intersecting direction Z. In this manner, the number of bent portions in the fluid supply system 1 decreases, and it is possible to relatively shorten the length of each fluid line 8 as compared with each fluid line 54 in the related art.

Here, in the treatment process based on the ALD method, it is necessary to quickly and precisely supply a minute flow amount of treatment gas to the chamber 48. This leads to a significant increase in the number of times the opening/closing valve 50 is switched, there is a requirement to switch the opening/closing valve 50 at a high speed, and the fluid control performed by the opening/closing valve 50 is performed on the basis of precise pulse control. According to the present embodiment, it is possible to reduce the pulse width in relation to the pulse control of the fluid as compared with the related art and to obtain a more precise rectangular pulse shape as compared with the related art since the length of each fluid line 8 is shortened as compared with the related art.

The semiconductor manufacturing device 42 according to the present embodiment can thus more quickly and more precisely supply a minute flow amount of treatment gas to the chamber 48 as compared with the related art and can achieve further improved responsiveness and controllability of the treatment process based on the ALD method.

As described above, according to the present embodiment, it is possible to further reduce the fluid supply system 1 in size while securing a working space in the piping structure 16 in the fluid supply system 1, to further reduce the fluid control device 12 including the fluid supply system 1 in size, and further to improve responsiveness and controllability in the treatment process based on the ALD method performed by the semiconductor manufacturing device 42 including the fluid control device 12.

The embodiment of the present invention has been described hitherto. However, the present invention is not limited to the aforementioned embodiment and can be modified in various manners without departing from the gist of the present invention.

For example, the fluid supply system 1 can be applied not only to the gas supply system and can widely be applied to systems that supply fluids including liquids, and the fluid control device 12 can be applied not only to a semiconductor manufacturing process, such as the semiconductor manufacturing device 42, but also to various processes.

EXPLANATION OF REFERENCE SIGNS

1 fluid supply system
2 fluid controller
2*a*, 2*b* connection surface
4 joint
6, 6*a*, 6*b* piping
8 fluid line
12 gas box, fluid control device
14 casing
18 bent portion
male nut (first joint member)
22 female nut (second joint member)
24 torque applied portion
42 semiconductor manufacturing device
48 chamber
50 opening/closing valve
Dp diameter of piping
Dd1, Dd2 diameter of joint
W surface width of connection surface
X extension direction
Y alignment direction
Z intersecting direction

The invention claimed is:
1. A fluid supply system comprising:
a plurality of fluid lines aligned in parallel, fluid controllers and joints being connected in series with pipings in the fluid lines,
wherein each of the fluid lines linearly extends in an extension direction that perpendicularly intersects an alignment direction of the fluid lines when the fluid lines are seen in a plane including the alignment direction,
each of the fluid controllers is disposed in an aligned manner in the alignment direction with connection surfaces of the fluid controllers to which the pipings are connected directed to the extension direction,
a diameter of the pipings is equal to or less than a surface width of the connection surfaces in the alignment direction, and diameters of the joints are equal to or greater than the surface width, and the pipings that are adjacent to each other in the alignment direction are positioned with the joints displaced from each other in the extension direction, wherein an intersecting direction is defined that perpendicularly intersects both the alignment direction and the extension direction, and at least one of any two of the pipings that are adjacent to each other in the alignment direction has a bent portion that positions the joints displaced from each other in the intersecting direction.

2. The fluid supply system according to claim 1, wherein the joints have first joint members, second joint members screwed to the first joint members, and torque applied portions to which a rotation torque is applied when the second joint members are screwed to the first joint members, when the intersecting direction that perpendicularly intersects both the alignment direction and the extension direction is defined, the pipings that are adjacent to each other in the alignment direction are positioned with at least the torque applied portions of the joints displaced from each other in both the extension direction and the intersecting direction.

3. A fluid control device comprising:
the fluid supply system according to claim 1 accommodated in a casing.

4. A semiconductor manufacturing device that includes the fluid control device according to claim 3, comprising:
a chamber, to which the pipings extending from the fluid control device are connected, in which a fluid supplied from the fluid control device is treated; and
an opening/closing valve provided at the pipings between the fluid control device and the chamber to control the flow amount of the fluid supplied from the fluid control device to the chamber.

5. The fluid supply system of claim 1, wherein the pipings are connected to the respective connection surfaces by screwed engagements.

6. The fluid supply system of claim 5, wherein the joints each include a torque applied portion to accept a wrench, and wherein there are no torque applied portions at the screwed engagements between the pipings and the connection surfaces of the fluid controllers.

7. A fluid supply system comprising: a plurality of fluid lines aligned in parallel, fluid controllers and joints being connected in series with pipings in the fluid lines; and one or more base blocks to which the fluid controllers are secured, the one or more base blocks connected in the fluid lines, wherein each of the fluid lines linearly extends in an extension direction that perpendicularly intersects an alignment direction of the fluid lines when the fluid lines are seen in a plane including the alignment direction, each of the fluid controllers is disposed in an aligned manner in the alignment direction with at least one connection surface of the at least one base blocks to which the pipings are connected directed to the extension direction, a diameter of the pipings is equal to or less than a surface width of the at least one connection surface in the alignment direction, and diameters of the joints are equal to or greater than the surface width, the pipings that are adjacent to each other in the alignment direction have different lengths between the at least one connection surfaces and the respective joints in the extension direction such that the joints are displaced from each other in the extension direction, wherein an intersecting direction is defined that perpendicularly intersects both the alignment direction and the extension direction, and at least one of any two of the pipings that are adjacent to each other in the alignment direction has a bent portion that positions the joints displaced from each other in the intersecting direction.

8. A fluid control device comprising:
the fluid supply system according to claim 7 accommodated in a casing.

9. A semiconductor manufacturing device that includes the fluid control device according to claim 8, comprising:
a chamber, to which the pipings extending from the fluid control device are connected, in which a fluid supplied from the fluid control device is treated; and
an opening/closing valve provided at the pipings between the fluid control device and the chamber to control the flow amount of the fluid supplied from the fluid control device to the chamber.

10. The fluid supply system of claim 8, wherein the pipings are connected to the at least one connection surfaces of the one or more base blocks by screwed engagements.

11. The fluid supply system of claim 10, wherein the joints each include a torque applied portion to accept a wrench, and wherein there are no torque applied portions at the screwed engagements between the pipings and the at least one connection surface.

12. The fluid supply system of claim 7, wherein the joints have first joint members, second joint members screwed to the first joint members, and torque applied portions to which a rotation torque is applied when the second joint members are screwed to the first joint members, when the intersecting direction that perpendicularly intersects both the alignment direction and the extension direction is defined, the pipings that are adjacent to each other in the alignment direction are positioned with at least the torque applied portions of the joints displaced from each other in both the extension direction and the intersecting direction.

* * * * *